T. G. BLOOD.
SAUCEPAN AND LIKE COOKING AND HEATING APPLIANCE.
APPLICATION FILED JUNE 23, 1920.

1,391,525.

Patented Sept. 20, 1921.
2 SHEETS—SHEET 1.

Inventor
Thomas Guy Blood
By
Attorney

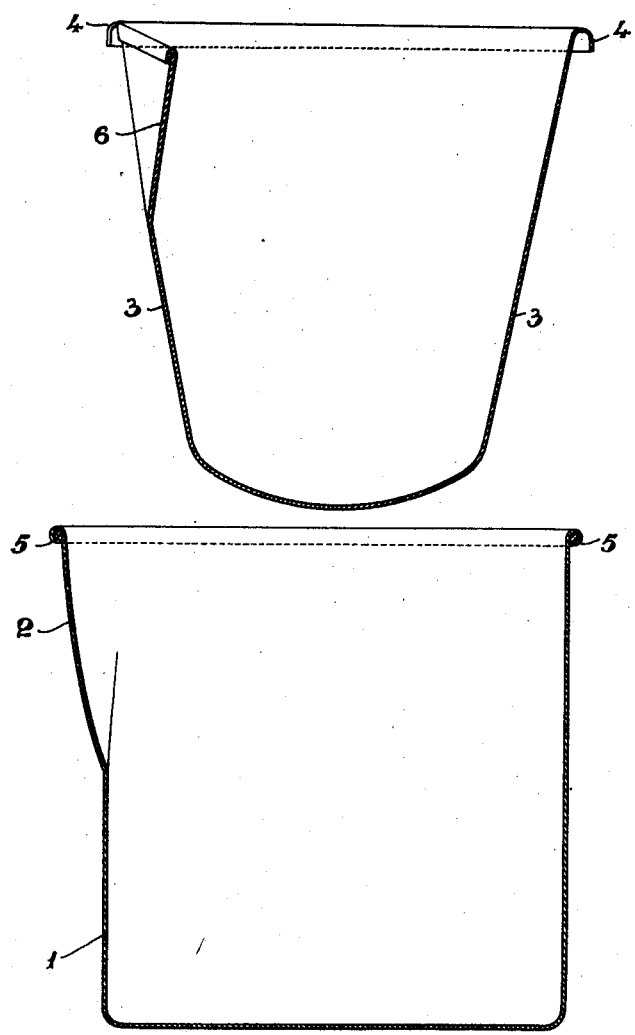

UNITED STATES PATENT OFFICE.

THOMAS GUY BLOOD, OF BIRMINGHAM, ENGLAND.

SAUCEPAN AND LIKE COOKING AND HEATING APPLIANCES.

1,391,525.  Specification of Letters Patent.  Patented Sept. 20, 1921.

Application filed June 23, 1920. Serial No. 391,209.

*To all whom it may concern:*

Be it known that I, THOMAS GUY BLOOD, subject of the King of Great Britain, residing at William street north, Birmingham, England, have invented certain new and useful Improvements in Saucepans and like Cooking and Heating Appliances, of which the following is a specification.

This invention relates to double-saucepans for cooking porridge and other foods, and to like cooking and heating appliances such as meat-dishes, hot-water plates or dishes and kettles, of the kind comprising inner and outer vessels secured together at their upper ends and having their walls separated by a space or jacket into which water can be introduced through a suitable aperture.

The object of the present invention is to provide an improved construction of this type of article which can be cheaply manufactured.

According to the invention, the outer vessel is provided with an outwardly projecting channel or lip, while the inner vessel has an inwardly projecting channel or lip situated opposite to the channel or lip of the outer vessel, so as to form the filling and emptying aperture between said parts.

Figure 1 of the accompanying drawings represents a top-side plan of a porridge or like saucepan constructed in accordance with this invention.

Fig. 3 shows, in section, the two vessels before being fitted and secured together.

Figure 1:
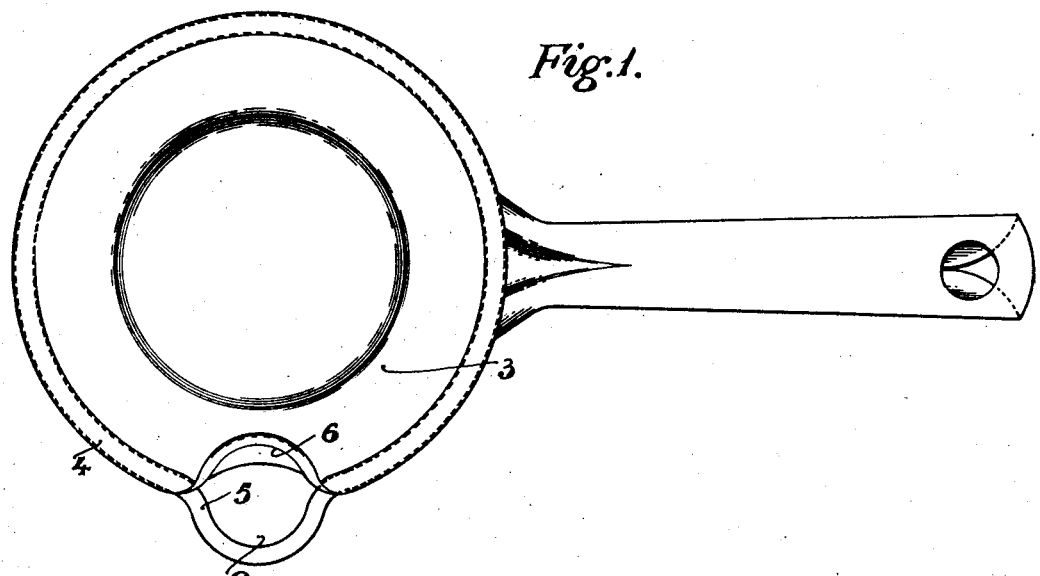
Figure 2:
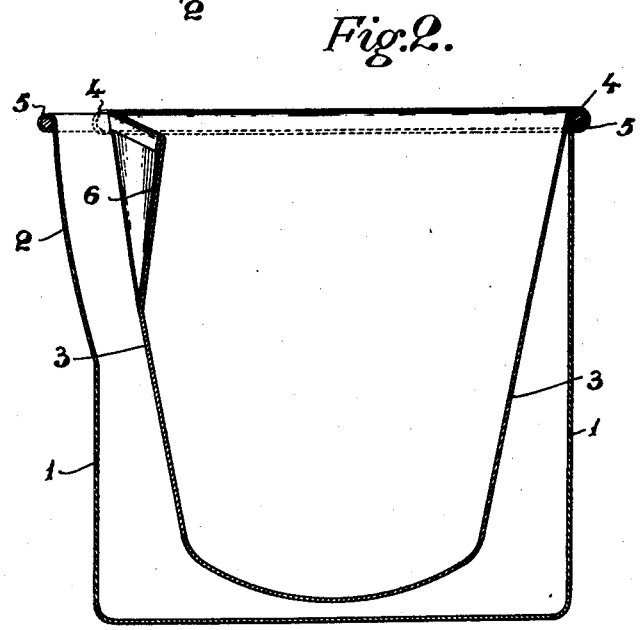
Fig. 2 is a vertical section through same.

Referring to the drawings, the outer vessel 1 of the improved porridge or like saucepan consists of an ordinary single saucepan, provided with an outwardly projecting pouring spout or lip 2 at one side, said spout or lip being in the form of a vertical channel or depression. The inner vessel 3 is of conical form and has a flange 4 around its upper edge which rests upon and is secured around the beaded edge 5 of the outer vessel. At one side, at a point opposite to the spout or lip 2 of the outer vessel 1, the inner vessel 3 is provided with a vertical channel or depression 6 extending to the upper edge and projecting radially into the interior of the said inner vessel. By this means an open vertical passage is formed between the oppositely directed lips or channeled parts 2 and 6 of the vessels, for the purpose of filling and emptying the outer vessel, half or part of the passage being formed in the outer vessel and the other half or part formed in the inner vessel.

In cooking utensils of this class in which the inner and outer vessels are unitarily secured together it is important that in pouring a substance from the inner vessel it should not be spilled into the outer vessel on account of the comparative difficulty in thoroughly cleansing the same. By providing the inwardly projecting lip 6 I have devised a fender or guard for the filler opening which latter divides the mass of food or other substance being poured so that it will be turned to either side of the filler opening and not run into the latter.

The vessels may either be spun or stamped, and are preferably made from sheet aluminium.

Having fully described my invention, what I desire to claim and secure by Letters Patent is:—

1. A saucepan and like cooking and heating appliance comprising an outer vessel with an outwardly projecting vertical lip, and an inner vessel with an inwardly projecting lip situated opposite to the lip of the said outer vessel.

2. A saucepan and like cooking and heating appliance comprising an outer vessel with an outwardly projecting vertical lip, and an inner vessel with an inwardly projecting lip situated opposite to the lip of the outer vessel, the edge of the said inner vessel being formed with an outwardly extending flange which rests upon and is secured around the beaded edge of the outer vessel.

In testimony whereof I have hereunto set my hand in presence of two subscribing witnesses.

THOMAS GUY BLOOD.

Witnesses:
W. N. MERRITT,
W. L. SKERRETT.